United States Patent
Sugisawa

(10) Patent No.: US 6,945,102 B2
(45) Date of Patent: Sep. 20, 2005

(54) METHOD AND APPARATUS FOR DETECTING DECREASE IN TIRE AIR-PRESSURE AND PROGRAM FOR JUDGING DECOMPRESSION OF TIRE

(75) Inventor: Toshifumi Sugisawa, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 10/743,043

(22) Filed: Dec. 23, 2003

(65) Prior Publication Data

US 2004/0134269 A1 Jul. 15, 2004

(30) Foreign Application Priority Data

Dec. 25, 2002 (JP) ......................... 2002-374878

(51) Int. Cl.$^7$ .................. G01M 17/02; B60C 23/00
(52) U.S. Cl. .................. 73/146; 340/444
(58) Field of Search .................. 73/146, 146.4, 73/146.5; 340/442–447

(56) References Cited

U.S. PATENT DOCUMENTS 5,589,815 A * 12/1996 Nishihara et al. ........... 340/444
5,839,801 A * 11/1998 Ferguson ..................... 303/191

FOREIGN PATENT DOCUMENTS

| EP | 0 768 193 A1 | 4/1997 |
| EP | 0 908 331 A2 | 4/1999 |
| JP | 2002-234317 A | 8/2002 |
| JP | 2002-234320 A | 8/2002 |
| JP | 2002-234321 A | 8/2002 |

* cited by examiner

Primary Examiner—William Oen
(74) Attorney, Agent, or Firm—Birch, Stewart, Kolasch & Birch, LLP

(57) ABSTRACT

A method for detecting decrease in internal pressure of a tire mounted to a vehicle on the basis of rotational information obtained from the tire. The method includes the steps of: detecting the rotational information of the respective tires; storing the rotational information of the respective tires; calculating a front and rear wheel ratio which can be obtained on the basis of rotational information of both front wheels and rotational information of both rear wheels of the vehicle; calculating a driving wheel torque of the vehicle; and obtaining a value of the front and rear wheel ratio when the driving wheel torque is zero on the basis of a relationship between the front and rear wheel ratio and the driving wheel torque. It is possible to shorten the time for obtaining effective front and rear wheel ratios.

5 Claims, 3 Drawing Sheets

METHOD AND APPARATUS FOR DETECTING DECREASE IN TIRE AIR-PRESSURE AND PROGRAM FOR JUDGING DECOMPRESSION OF TIRE

This Nonprovisional application claims priority under 35 U.S.C. §119(a) on Patent Application No(s). 2002-374878 filed in Japan on Dec. 25, 2002, the entire contents of which are hereby incorporated by reference.

BACKGROUND OF THE INVENTION

The present invention relates to a method and apparatus for detecting decrease in tire air-pressure and a program for judging decompression of a tire.

An apparatus for detecting decrease in tire air-pressure in which decompression of a tire is detected on the basis of rotational (wheel speed) information of four wheel tires mounted to a vehicle is conventionally known. Such an apparatus employs a theory that a rotational angular velocity of a decompressed tire is increased owing to a decrease in outer diameter (dynamic load radius of the tire) as compared to a tire of normal internal pressure. In a method for detecting decrease in internal pressure on the basis of a relative difference in rotational angular velocities of tires, $$DEL=\{(F1+F4)/2-(F2+F3)/2\}/\{(F1+F2+F3+F4)/4\}\times 100(\%)$$

is employed as a judged value DEL (reference should be made to Japanese Unexamined Patent Publication No. 305011/1988). Here, F1 to F4 denote rotational angular velocities of a front left tire FL, a front right tire FR, a rear left tire RL and a rear right tire RR, respectively.

Since tires are manufactured to include variations (initial differences) within standards, effective rolling radii of the respective tires (a value obtained by dividing a distance which has been traveled by a single rotation by $2\pi$) are not necessarily identical even though all of the tires are at normal internal pressure. This will result in variations in the rotational angular velocities $F_i$ of the respective tires, and when the above DEL values are calculated in this state, it might happen that DEL=0 is not satisfied even if the internal pressure is normal to issue erroneous alarm.

Processes of obtaining correction coefficients for correcting variations caused during the manufacture of tires (initialization) are therefore performed. More particularly, the following three coefficients are obtained.

F2=fac1×F1
F3=fac3×F1
F4=fac3×fac2×F1

Here, fac1, fac2 and fac3 are correction coefficients which are obtained at normal internal pressure, wherein fac1 is a correction coefficient for correcting differences in effective rolling radii owing to initial differences between right and left front tires FL, FR; fac2 is a correction coefficient for correcting differences in effective rolling radii owing to initial differences between right and left rear tires RL, RR; and fac3 is a correction coefficient for correcting differences in effective rolling radii owing to initial differences between an average of the front axial tires ((FL+FR)/2) and an average of the rear axial tires ((RL+RR)/2), and these correction coefficients fac1, fac2 and fac3 are obtained through running tests when the tires are at normal internal pressure.

From among these correction coefficients, fac3 represents a front and rear wheel ratio, and is a value necessary for accurately obtaining a DEL value.

Since the front and rear wheel ratio is obtained on the basis of wheel speeds of the four wheels, such a value is affected not only by the variations caused during the manufacture of tires but also by slip caused through the driving. Since it is accordingly difficult to obtain effective front and rear wheel ratios when the vehicle is running on a flat road at constant speed, it is preferable that such ratios are obtained only when the vehicle is in a gradually decelerating condition.

However, a condition in which "the vehicle is in a gradually decelerating condition" might be extremely rare depending on running conditions. In such a case, effective front and rear wheel ratios can be hardly obtained, and it might take a long time until front and rear wheel ratios necessary for judging decompression are obtained.

SUMMARY OF THE INVENTION

In view of the above facts, it is an object of the present invention to provide a method and apparatus for detecting decrease in tire air-pressure and a program for judging decompression of a tire with which it is possible to shorten the period of time for obtaining effective front and rear wheel ratios.

In accordance with a first aspect of the present invention, there is provided a method for detecting decrease in tire air-pressure, which is a method for detecting decrease in internal pressure of a tire mounted to a vehicle on the basis of rotational information obtained from the tire. The method includes the steps of: detecting the rotational information of the respective tires; storing the rotational information of the respective tires; calculating a front and rear wheel ratio which can be obtained on the basis of rotational information of both front wheels and rotational information of both rear wheels of the vehicle; calculating a driving wheel torque of the vehicle; and obtaining a value of the front and rear wheel ratio when the driving wheel torque is zero on the basis of a relationship between the front and rear wheel ratio and the driving wheel torque.

In accordance with a second aspect of the present invention, there is provided an apparatus for detecting decrease in tire air-pressure, which is an apparatus for detecting decrease in internal pressure of a tire mounted to a vehicle on the basis of rotational information from the tire. The apparatus includes rotational information detecting means for detecting rotational information of respective tires; storing means for storing the rotational information of the respective tires; front and rear wheel ratio calculating means for calculating a front and rear wheel ratio which can be obtained on the basis of rotational information of both front wheels and rotational information of both rear wheels of the vehicle; torque calculating means for calculating a driving wheel torque of the vehicle; and zero calculating means for obtaining a value of the front and rear wheel ratio when the driving wheel torque is zero on the basis of a relationship between the front and rear wheel ratio and the driving wheel torque.

In accordance with a third aspect of the present invention, there is provided a program for judging decompression of a tire in which for judging decrease in tire air-pressure, a computer is made to function as storing means for storing the rotational information of the respective tires; front and rear wheel ratio calculating means for calculating a front and rear wheel ratio which can be obtained on the basis of rotational information of both front wheels and rotational information of both rear wheels of the vehicle; torque calculating means for calculating a driving wheel torque of the vehicle; and zero calculating means for obtaining a value of the front and rear wheel ratio when the driving wheel torque is zero on the basis of a relationship between the front and rear wheel ratio and the driving wheel torque.

DETAILED DESCRIPTION

The method and apparatus for detecting decrease in tire air-pressure and the program for detecting decrease in tire air-pressure according to the present invention will now be explained with reference to the accompanying drawings.

Figure 1:
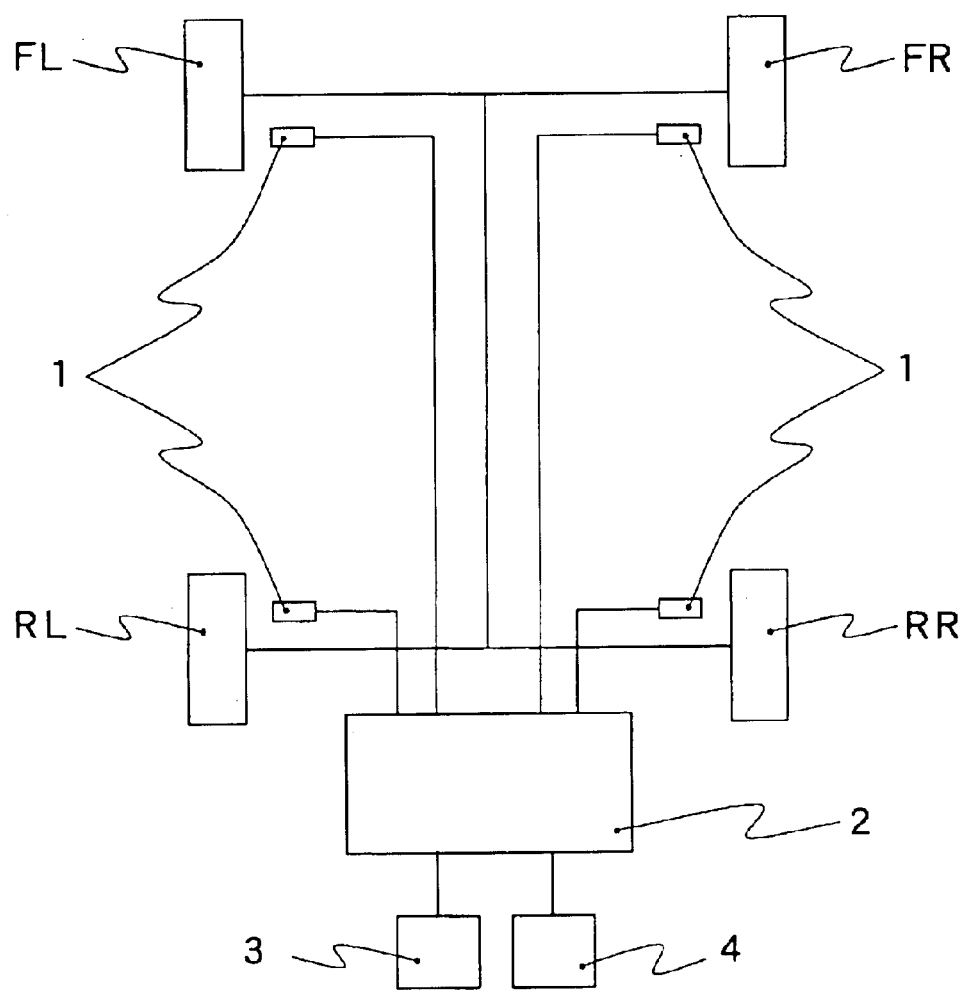
FIG. 1 is a block diagram illustrating one embodiment of the apparatus for detecting decrease in tire air-pressure according to the present invention.

As illustrated in FIG. 1, the apparatus for detecting decrease in tire air-pressure according to one embodiment of the present invention is for judging whether air-pressure of either of four tires FL, FR, RL and RR provided in a four-wheeled vehicle is decreased or not, and includes ordinary rotational information detecting means 1 respectively provided in relation to the respective tires.

The rotational information detecting means 1 might be a wheel speed sensor for measuring wheel speed information (rotational speeds) on the basis of the number of pulses upon generating rotational pulses by using an electromagnetic pickup or similar or an angular velocity sensor in which power is generated by using rotation such as in a dynamo, wherein the wheel speed is measured from a voltage thereof. Outputs of the rotational information detecting means 1 are supplied to a control unit 2 which is a computer such as an ABS. A display 3 composed of liquid crystal elements, plasma display elements or CRT for indicating a tire of which the tire air-pressure has decreased, and an initialization switch 4 which might be operated by a driver are connected to the control unit 2.

Figure 2:
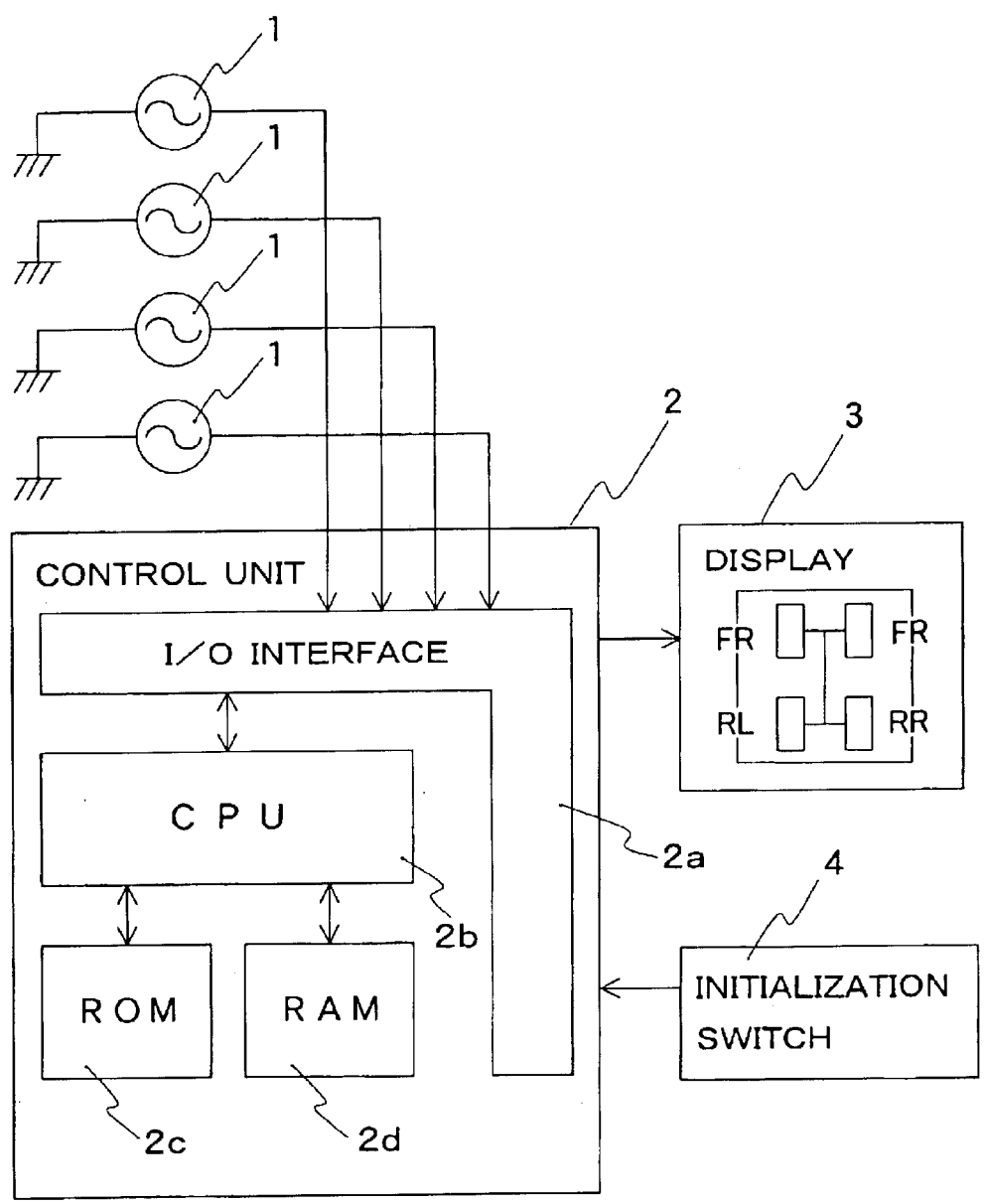
FIG. 2 is a block diagram illustrating electric arrangements of the apparatus for detecting decrease in tire air-pressure of FIG. 1.

As illustrated in FIG. 2, the control unit 2 includes an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

Pulse signals corresponding to the rotational number of the tire (hereinafter referred to as "wheel speed pulse") are output from the rotational information detecting means 1. In the CPU 2b, rotational angular velocities $F_i$, for the respective tires are calculated on the basis of the wheel speed pulses as output from the rotational information detecting means 1 at specified sampling periods $\Delta T$ (sec), for instance, $\Delta T=1$.

Since the tires are manufactured to include variations (initial differences) within standards, corrected rotational angular velocities $F1_i$ are calculated to cancel variations owing to initial differences. More particularly, corrections are performed to satisfy:

$F1_1 = F_1$
$F1_2 = fac1 \times F_2$
$F1_3 = fac3 \times F_3$
$F1_4 = fac3 \times fac2 \times F_4$ Here, fac1, fac2 and fac3 are correction coefficients which are obtained at normal internal pressure in accordance with the following equations, wherein fac1 is a correction coefficient for correcting differences in effective rolling radii owing to initial differences between right and left front tires FL, FR, fac2 is a correction coefficient for correcting differences in effective rolling radii owing to initial differences between right and left rear tires RR, RL, and fac3 is a correction coefficient for correcting differences in effective rolling radii owing to initial differences between an average of the front axial tires ((FL+FR)/2) and an average of the rear axial tires ((RL+RR)/2), and these correction coefficients fac1, fac2 and fac3 are obtained when performing initialization running at normal internal pressure and are stored in the RAM 2d.

$F2 = fac1 \times F1$
$F3 = fac3 \times F1$
$F4 = fac3 \times fac2 \times F1$

From among these correction coefficients, with respect to the front and rear wheel ratio (fac3), it is possible to complete acquisition of an effective front and rear wheel ratio used for issuing alarm for indicating decrease in tire air-pressure at an early stage by estimating a value of the front and rear wheel ratio when the driving wheel torque is close to zero, on the basis of a relationship between the front and rear wheel ratio of the vehicle and the driving wheel torque.

Accordingly, the apparatus for detecting decrease in tire air-pressure according to the present embodiment includes the rotational information detecting means 1; storing means for storing the rotational information of the respective tires; front and rear wheel ratio calculating means for calculating a front and rear wheel ratio which can be obtained on the basis of rotational information of both front wheels and rotational information of both rear wheels of the vehicle; torque calculating means for calculating a driving wheel torque of the vehicle; and zero calculating means for obtaining a value of the front and rear wheel ratio when the driving wheel torque is zero on the basis of a relationship between the front and rear wheel ratio and the driving wheel torque.

According to the program for judging decompression of a tire of the present embodiment, the control unit 2 is made to function as the storing means for storing the rotational information of the respective tires; the front and rear wheel ratio calculating means for calculating a front and rear wheel ratio which can be obtained on the basis of rotational information of both front wheels and rotational information of both rear wheels of the vehicle; the torque calculating means for calculating a driving wheel torque of the vehicle; and the zero calculating means for obtaining a value of the front and rear wheel ratio when the driving wheel torque is zero on the basis of a relationship between the front and rear wheel ratio and the driving wheel torque.

The respective wheel speeds ($V1_n$, $V2_n$, $V3_n$, $V4_n$) of the four wheel tires of the vehicle are obtained from wheel speed data of the respective wheel tires of the vehicle obtained at an arbitrary point of time from a sensor such as an ABS sensor. It should be noted that $V1_n$, $V2_n$, $V3_n$, and $V4_n$ represent wheel speeds of the front left tire, the front right tire, the rear left tire and the rear right tire, respectively. On the basis of these wheel speeds, a ratio of the front and rear wheels (front and rear wheel ratio) S between an average wheel speed $Vd_n$ of the driving wheels and an average wheel speed $Vf_n$ of following wheels is calculated from the following equation (1) when the vehicle is a front-wheel-drive vehicle.

$$S = Vd_n / Vf_n \qquad (1)$$

Here, $Vd_n$ is $(V1_n + V2_n)/2$ and $Vf_n$ is $(V3_n + V4_n)/2$.

The driving wheel torque can be derived from the torque and the rotational number of the engine or the like obtained from a control device for the engine. A driving wheel torque T per driving wheel might be represented, for instance, by the following equation (2).

T=(engine torque×rotational number of the engine)/(rotational number of the driving wheel×number of driving wheels)  (2)

In this equation (2), (rotational number of the engine/rotational number of the driving wheel) can be calculated from the gear ratio or a shift position (corresponding to L, 2, 3, of a transmission gear of a vehicle, and when the vehicle is an automatic car, it can be understood in which gear the vehicle is running. By storing the respective gear ratios, it is possible to know the value for the (rotational number of the engine/rotational number of the driving wheel) only from the shift position).

The relationship between the front and rear wheel ratio S and the driving wheel torque T is represented by a regression line where a longitudinal axis represents the front and rear wheel ratio S and a lateral axis the driving wheel torque T, and the value of the front and rear wheel ratio when the driving wheel torque is zero can be obtained from this regression line.

Figure 3:
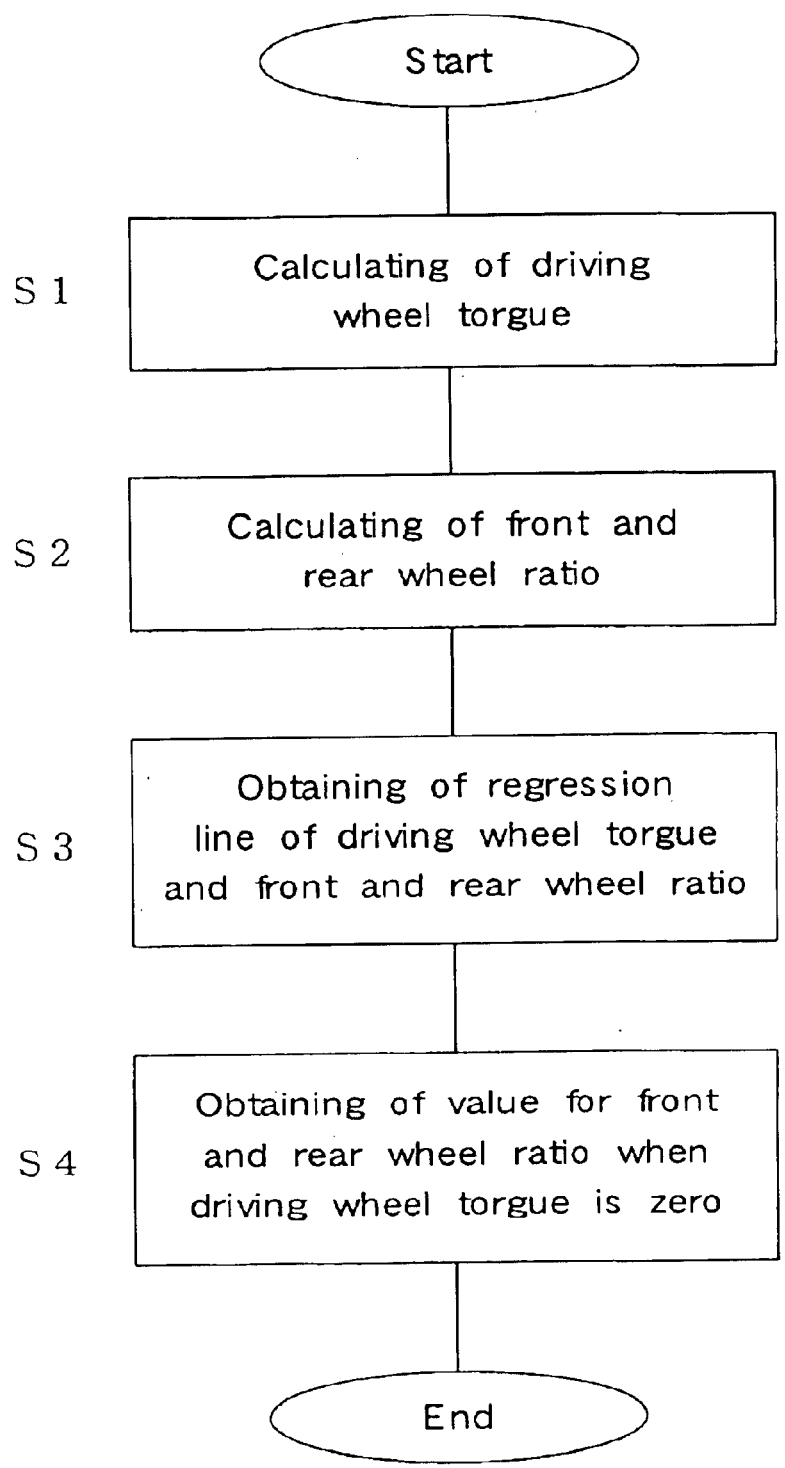
FIG. 3 is one example of a flowchart of the present embodiment.

Accordingly, in the procedure of the present embodiment (flowchart), the driving wheel torque of the vehicle is calculated (Step S1) from the above equation (2) as illustrated in FIG. 3. After sampling the rotational angular velocities of the four wheels for judging whether any rotational angular velocity is to be rejected or not, the front and rear wheel ratio is calculated from the above equation (1) by using the wheel speeds of the respective tires (Step S2). For judging such rejections, there are methods; one is by judging whether the road surface is bad or not and another is by judging whether values fall within specified ranges for front and rear directional accelerations, low velocity running or turning radii or not. Upon performing regression analysis of data related to driving wheel torque and front and rear wheel ratio (least square method), the regression line is obtained (Step S3). A value for the front and rear wheel ratio where the driving wheel torque is zero is obtained from this regression line (Step S4).

While the present invention will now be explained on the basis of an example thereof, the present invention is not limited to such an example alone.

EXAMPLES

An FF (Front engine/front drive) vehicle equipped with tires of normal internal pressure ($2.2 \times 10^5$ Pa) was prepared as a vehicle. The tire size of the tires was 185/70R14. For performing running tests with the vehicle, the apparatus for detecting decrease in tire air-pressure programmed to judge decompression of a tire in accordance with the above-described embodiment was mounted thereon, and initialization was performed at normal internal pressure. Thereafter, the vehicle was made to run on an urban expressway at a velocity of 60 to 80 km/h, and front and rear wheel ratios were obtained in accordance with the procedure as illustrated in FIG. 3.

An apparatus like a conventional one in which front and rear wheel ratios are obtained only when the vehicle is in a gradually decelerating condition was mounted on the vehicle for performing the same running tests as in the present example (comparative example). The front and rear wheel ratios in the comparative example were obtained in accordance with steps for judging rejections and for judging whether the vehicle is in a gradually decelerating condition or not.

Since judgment whether the vehicle is in a gradually decelerating condition or not, that is, whether −0.1<front and rear directional acceleration<−0.05 is satisfied or not, is performed for acquiring the front and rear ratios in the comparative example, such conditions for judging decompression are not met while the vehicle is running at a constant speed, and it took as much as 1 hour and 15 minutes until front and rear wheel ratios were obtained. In this respect, the time for acquisition is determined where a specified number of pieces of effective data has been reached.

In contrast thereto, the time for acquiring front and rear wheel ratios in the present example was shorter than that of the comparative example and 17 minutes. This is due to the fact that values of front and rear wheel ratios are obtained when the driving wheel torque is zero on the basis of the regression line without performing judgment of deceleration.

As explained so far, according to the present invention, it is possible to shorten the time for obtaining effective front and rear wheel ratios.

What is claimed is:

1. A method for detecting decrease in internal pressure of a tire mounted to a vehicle on the basis of rotational information obtained from the tire, comprising the steps of: detecting the rotational information of the respective tires; storing the rotational information of the respective tires; calculating a front and rear wheel ratio which can be obtained on the basis of rotational information of both front wheels and rotational information of both rear wheels of the vehicle; calculating a driving wheel torque of the vehicle; and obtaining a value of the front and rear wheel ratio when the driving wheel torque is zero on the basis of a relationship between the front and rear wheel ratio and the driving wheel torque.

2. The method of claim 1, wherein the relationship between the front and rear wheel ratio and the driving wheel torque is represented by a regression line.

3. An apparatus for detecting decrease in internal pressure of a tire mounted to a vehicle on the basis of rotational information from the tire, comprising: rotational information detecting means for detecting rotational information of respective tires; storing means for storing the rotational information of the respective tires; front and rear wheel ratio calculating means for calculating a front and rear wheel ratio which can be obtained on the basis of rotational information of both front wheels and rotational information of both rear wheels of the vehicle; torque calculating means for calculating a driving wheel torque of the vehicle; and zero calculating means for obtaining a value of the front and rear wheel ratio when the driving wheel torque is zero on the basis of a relationship between the front and rear wheel ratio and the driving wheel torque.

4. The apparatus of claim 3, wherein the relationship between the front and rear wheel ratio and the driving wheel torque is represented by a regression line.

5. A program for judging decompression of a tire in which for judging decrease in tire air-pressure, a computer is made to function as storing means for storing the rotational information of the respective tires; front and rear wheel ratio calculating means for calculating a front and rear wheel ratio which can be obtained on the basis of rotational information of both front wheels and rotational information of both rear wheels of the vehicle; torque calculating means for calculating a driving wheel torque of the vehicle; and zero calculating means for obtaining a value of the front and rear wheel ratio when the driving wheel torque is zero on the basis of a relationship between the front and rear wheel ratio and the driving wheel torque.

* * * * *